United States Patent
Kazmi et al.

(10) Patent No.: US 10,219,172 B2
(45) Date of Patent: *Feb. 26, 2019

(54) METHOD AND APPARATUS FOR TESTING MOBILE TERMINALS IN AN OFDM SYSTEM

(71) Applicant: Telefonaktiebolaget L M Ericsson (publ), Stockholm (SE)

(72) Inventors: Muhammad Kazmi, Bromma (SE); Joakim Axmon, Kävlinge (SE); Christian Bergljung, Lund (SE); Farshid Ghasemzadeh, Sollentuna (SE); Walter Gerhard Alois Müller, Upplands Väsby (SE)

(73) Assignee: Telefonaktieboloaget LM Ericsson (publ), Stockholm (SE)

( * ) Notice: Subject to any disclaimer, the term of this patent is extended or adjusted under 35 U.S.C. 154(b) by 205 days.

This patent is subject to a terminal disclaimer.

(21) Appl. No.: 15/051,986

(22) Filed: Feb. 24, 2016

(65) Prior Publication Data

US 2016/0174086 A1 Jun. 16, 2016

Related U.S. Application Data

(63) Continuation of application No. 13/668,890, filed on Nov. 5, 2012, now Pat. No. 9,307,426, which is a
(Continued)

(30) Foreign Application Priority Data

Dec. 8, 2008 (SE) .................. PCT/SE2008/051421

(51) Int. Cl.
*H04W 24/06* (2009.01)
*H04W 24/08* (2009.01)
*H04W 72/04* (2009.01)

(52) U.S. Cl.
CPC ......... *H04W 24/06* (2013.01); *H04W 24/08* (2013.01); *H04W 72/04* (2013.01)

(58) Field of Classification Search
CPC .................................................... H04W 24/06
(Continued)

(56) References Cited

U.S. PATENT DOCUMENTS 6,141,646 A 10/2000 Thomas et al.
6,456,652 B1 9/2002 Kim et al.
(Continued)

FOREIGN PATENT DOCUMENTS

CN 1717090 A 1/2006
EP 1906569 A1 4/2008
(Continued)

OTHER PUBLICATIONS

3rd Generation Partnership Project, "Annex A (normaltive): Text Cases," 3GPP TS 25.133 V7.12.0 (May 2008). pp. 95-182, Valbonne Sophia Antipolis, France, (Release 7).
(Continued)

*Primary Examiner* — Derrick W Ferris
*Assistant Examiner* — Abdeltif Ajid
(74) *Attorney, Agent, or Firm* — Coats & Bennett, PLLC

(57) ABSTRACT

The present invention relates to a method and apparatus for testing mobile terminals in an OFDMA system, in which all or part of available downlink radio resources in a cell are transmitted. A processing unit in a test apparatus splits a set of contiguous resource blocks into separate contiguous portions. A first contiguous portion of the set of resource blocks is allocated to users of a first type, and a second contiguous portion of the set of resource blocks is allocated to users of a second type. A transmitter in the test apparatus
(Continued)

transmits test signals to the users of the first type and the second type using the at least one contiguous set of resource blocks.

20 Claims, 3 Drawing Sheets

Related U.S. Application Data continuation of application No. 12/472,430, filed on May 27, 2009, now Pat. No. 8,411,553.

(60) Provisional application No. 61/061,290, filed on Jun. 13, 2008.

(58) Field of Classification Search
USPC .......................................................... 370/241
See application file for complete search history.

(56) References Cited

U.S. PATENT DOCUMENTS

| | | | |
|---|---|---|---|
| 6,490,314 | B1 | 12/2002 | Khayrallah |
| 7,392,460 | B2* | 6/2008 | Kim ..................... H04L 1/0003 |
| | | | 370/334 |
| 7,889,663 | B1 | 2/2011 | Wright |
| 7,894,394 | B2 | 2/2011 | Kim et al. |
| 7,933,287 | B2 | 4/2011 | Toda et al. |
| 8,027,297 | B2 | 9/2011 | Kim et al. |
| 8,121,081 | B2 | 2/2012 | Grob-Lipski |
| 2005/0207333 | A1* | 9/2005 | Rotstein .................. H04B 7/06 |
| | | | 370/203 |
| 2006/0120395 | A1 | 6/2006 | Xing et al. |
| 2007/0183522 | A1 | 8/2007 | Garrett et al. |
| 2007/0230356 | A1* | 10/2007 | Kalantri ................ H04W 24/06 |
| | | | 370/241 |
| 2007/0253381 | A1* | 11/2007 | Bachl .................... H04L 5/0037 |
| | | | 370/338 |
| 2008/0090575 | A1 | 4/2008 | Barak et al. |
| 2008/0132281 | A1* | 6/2008 | Kim ....................... H04B 7/063 |
| | | | 455/562.1 |
| 2008/0160988 | A1 | 7/2008 | Jami et al. |
| 2008/0192847 | A1* | 8/2008 | Classon ................ H04L 5/0007 |
| | | | 375/260 |
| 2008/0310359 | A1 | 12/2008 | McBeath et al. |
| 2009/0268630 | A1* | 10/2009 | Yellin ................... H04L 5/0007 |
| | | | 370/252 |
| 2010/0046451 | A1 | 2/2010 | Tada et al. |
| 2013/0136205 | A1 | 5/2013 | Ma et al. |

FOREIGN PATENT DOCUMENTS

| | | |
|---|---|---|
| JP | 2003224534 A | 8/2003 |
| JP | 2005244651 A | 9/2005 |
| JP | 2007325111 A | 12/2007 |
| JP | 2011524103 A | 8/2011 |
| WO | 2007020995 A1 | 2/2007 |
| WO | 2009013260 A1 | 1/2009 |

OTHER PUBLICATIONS

3rd Generation Partnership Project, "Annex C (normaltive): Downlink Physical Channels," 3GPP TS 25.101 V8.2.0 (Mar. 2008), pp. 157-171, Valbonne Sophia Antipolis, France, (Release 8).

Nokia, "Inclusion of OCNS definition for performance tests," TSG-RAN Working Group 4 (Radio) meeting #13, Sep. 4-8, 2000 Turin, Italy, TSGR4#13(00)0550.

3rd Generation Partnership Project, "Report of the 3GPP TSG RAN WG4 meeting #47," May 5-9, 2008, Kansas City, Missouri.

* cited by examiner

METHOD AND APPARATUS FOR TESTING MOBILE TERMINALS IN AN OFDM SYSTEM

RELATED APPLICATIONS

This application is a continuation of U.S. application Ser. No. 13/668890, filed on Nov. 5, 2012, which is a continuation of U.S. application Ser. No. 12/472,430, filed on May 27, 2009, which claims the benefit of International Application No. PCT/SE2008/051421, filed on Dec. 8, 2008, which claims the benefit of U.S. Provisional Application No. 61/061,290, filed on Jun. 13, 2008, the disclosures of each of which are incorporated herein by reference in their entirety.

BACKGROUND

Different types of User Equipment (UEs) performance requirements are specified in the standard. In order to ensure that UE meets these requirements, appropriate and relevant test cases are also specified. During the tests all the downlink radio resources are not typically needed for the user under test. In practical circumstances several users receive transmission simultaneously on different resources in a cell. To make the tests as realistic as possible these remaining channels or radio resources should be transmitted in a manner that mimics transmission to other users in a cell.

The objective of UE performance verification (or the so-called UE performance tests) is to verify that UE fulfils the desired performance requirements in a given scenario, conditions and channel environment. By desired performance requirements it is meant those specified in the standard or requested by an operator or by any prospective customer. The performance requirements span a very vast area of UE requirements, such as:

UE RF receiver requirements e.g. receiver sensitivity
UE RF transmitter requirements e.g. UE transmit power accuracy
UE demodulation requirements e.g. achievable throughput
Radio resource management requirements e.g. handover delay We can classify the UE verification into two categories:
Verification in lab
Verification in real network Verification in Lab In the verification in lab the base station is emulated by test equipment, which is often termed as system simulator. Thus all downlink transmission is done by the test equipment to the test UE. During a test all common and other necessary UE specific control channels are transmitted by the test equipment. In addition a data channel, e.g. PDSCH in E-UTRAN, is also needed to send necessary data and configure the UE. Furthermore typically a single UE is tested at a time. In most typical test cases the entire available downlink resources are not used by the UE. However to make test realistic the remaining downlink resources should also be transmitted to one or multiple virtual users.

In Orthogonal Frequency Division Multiple Access (OFDMA) system the transmission resources comprises of time-frequency resources called resource blocks, which are sent with some transmit power level, as described in more detail below. This type of resource allocation to generate load in OFDMA will be referred to as Orthogonal Frequency Division Multiplexing (OFDM) channel noise generator (OCNG) in the following. Thus OCNG is sent to a plurality of virtual users for loading the cell.

Verification in Real Network

These types of tests are demanded by the operators and are performed in a real network. The test may comprise of single or multiple UEs. Prior to the network roll out or in an early phase of deployment the traffic load is typically very low. In classical tests the cell load is generated by increasing transmission power on one or more common channels. However operators are now increasingly demanding the network vendors to generate cell load in realistic fashion for performing tests. This means resources, which are not allocated to the test users should be allocated to the virtual users emulating load in the cell. Thus either all or large part of available resources i.e. channels, transmit power etc is used in the tests. This requires base station to implement the ability to transmit remaining resources in order to generate load. Thus for OFDMA (i.e. in E-UTRAN) OCNG is also deemed to be implemented in an actual base station.

Noise Generation in WCDMA for UE Performance Verification

In Wideband Code Division Multiple Access (WCDMA) orthogonal channel noise simulator (OCNS) is used to load cells in the test. The OCNS is implemented in both test equipment and also possibly in the base station. In the former case it is standardized in TS 25.101 and TS 25.133 for each type of test or same for similar tests. The OCNS comprises of channelization code and relative power. In a CDMA system the position of channelization code in a code tree is sensitive to intra-cell interference. Therefore more careful selection of codes for OCNS and their power levels is needed. An example of OCNS from TS 25.101 for UE demodulation tests is quoted below:

TABLE 1

DPCH Channelization Code and relative level settings for OCNS signal

| Channelization Code at SF = 128 | Relative Level setting (dB) (Note 1) | DPCH Data (see Note 3) |
|---|---|---|
| 2 | −1 | The DPCH data for each channelization code shall be uncorrelated with each other and with any wanted signal over the period of any measurement. For OCNS with transmit diversity the DPCH data sent to each antenna shall be either STTD encoded or generated from uncorrelated sources. |
| 11 | −3 | |
| 17 | −3 | |
| 23 | −5 | |
| 31 | −2 | |
| 38 | −4 | |
| 47 | −8 | |
| 55 | −7 | |
| 62 | −4 | |
| 69 | −6 | |
| 78 | −5 | |
| 85 | −9 | |
| 94 | −10 | |
| 125 | −8 | |
| 113 | −6 | |
| 119 | 0 | |

(Note 1):
The relative level setting specified in dB refers only to the relationship between the OCNS channels. The level of the OCNS channels relative to the Ior of the complete signal is a function of the power of the other channels in the signal with the intention that the power of the group of OCNS channels is used to make the total signal add up to 1.
(Note 2):
The DPCH Channelization Codes and relative level settings are chosen to simulate a signal with realistic Peak to Average Ratio.
(Note 3):
For MBSFN, the group of OCNS channels represent orthogonal S-CCPCH channels instead of DPCH. Transmit diversity is not applicable to MBSFN which excludes STTD.

E-UTRAN Downlink Transmission

In E-UTRAN Orthogonal Frequency Division Multiplexing (OFDM) technology is used in the downlink, whereas DFT based pre-coded OFDM is used in uplink. In E-UTRAN the cell transmission bandwidth is divided into several time-frequency resources. Most of these resources comprise of resource blocks, which comprises of 0.5 ms (time slot) in time domain and 12 sub-carriers each of 15 kHz in frequency domain. However some of the resources used for common channels, e.g., Synchronization Channel (SCH) (primary and synchronization sequences) or reference symbols, are transmitted over one or more OFDM symbol in time domain in each sub-frame. Some other control signals such as Physical Control Format Indicator Channel (PCFICH), Physical HARQ Indicator Channel (PHICH) and Physical Downlink Control Channel (PDCCH) are also sent in specific OFDMA symbol in each sub-frame. The resource blocks are used for transmitted user data or some control signaling e.g. paging, system information etc.

Furthermore E-UTRAN is a pure packet data designed cellular system, in which transmissions of user data in uplink and downlink always take place via shared channels. As similar to HSPA in UTRAN, the UE monitors physical downlink control channels (PDCCH) in order to access UE dedicated user data on the physical downlink shared channel (PDSCH) and the network assigns uplink scheduling grants to the UE on demand basis for uplink transmission via the physical uplink control channel (PUCCH) and the physical uplink shared channel (PUSCH). Error detection is provided on transport blocks and control payloads through Cyclic Redundancy Check (CRC) on PDSCH and PUSCH, and HARQ operations ensure efficient re-transmissions.

In E-UTRAN, no downlink transmit power control (TPC) has been specified and uplink TPC commands are embedded in the control payload mapped to PDCCH, which are sent occasionally or frequently by the E-UTRAN base station (eNodeB).

Downlink Physical Signals and Channels in E-UTRAN.

The physical layer signals and channels in E-UTRAN downlink are:
- Physical layer signals, i.e. reference signal (pilots) and synchronization signals;
- Physical broadcast channel (PBCH);
- PDCCH and PDSCH;
- Physical control format indicator channel (PCFICH); and
- Physical HARQ indicator channel (PHICH)

Following observations can be made:
- Physical layer signals and PBCH are transmitted periodically;
- Error detection via CRC of transport blocks mapped to PBCH and PDSCH, and of control data mapped to PDCCH;
- Some uplink transmissions shall result in downlink responses through the physical channels PDCCH and PHICH.

The cell load is generated by OCNS in WCDMA, UTRAN TDD or other CDMA systems. The same concept is not needed in E-UTRAN since radio interface is based on OFDMA technology, which is less sensitive to intra-cell interference. But there is still some leakage across the sub-carriers contributing to intra-cell interference due to transmitter and receiver imperfections. However inter-cell interference is not orthogonal and therefore it can still be considerable in OFDMA like in CDMA. Currently no rules on how to generate cell load for performing UE performance test are available for OFDMA systems.

SUMMARY

Thus, the objective of this invention is to define rules for loading the cell or test equipment based on OFDMA technology in the downlink for performing UE tests in realistic manner and according to well defined principles.

A first aspect of the present invention relates to a method for performing tests of mobile terminals or UEs designed to operate in an OFDMA system. During the test, all or part of available downlink radio resources in a cell of the OFDMA system are transmitted. One exemplary method comprises allocating at least one set of contiguous resource blocks by: allocating a first contiguous portion of the set of the resource blocks to users of a first type; and allocating a second contiguous portion of the set of resource blocks to users of a second type. The test signals are then transmitted to the users of the first type and the second type using the at least one contiguous set of resource blocks In one or more embodiments the first type of users are test users, and the second type of users are virtual users. Since the mobile terminals under test only decode mobile terminal specific channels, and not the channels used for the virtual users, the splitting of the transmitted resources means that the decoding is made less complex. Thus, the method according to this aspect of the invention, involving separating the resources allocated for the mobile terminals under test and for the virtual users respectively into separate unities in the frequency domain, provides consistency to the test performance by applying the specified rule that implies a low complexity and constrain on the mobile terminals performing the test.

Here, the term "contiguous" has the meaning of a consecutive, i.e continuous, arrangement within each unity.

In a specific embodiment of the invention, the resources are split such that one or more contiguous unities of resources in the center of an available cell bandwidth are allocated to the one or more mobile terminals under test, and one or more contiguous unities of resources at the edges of said cell bandwidth are allocated to virtual users.

In another specific embodiment, the resources are split such that one or more contiguous unities of resources at the edges of said cell bandwidth are allocated to the one or more mobile terminals under test, and one or more contiguous unities of resources in the center of an available cell bandwidth are allocated to virtual users.

A second aspect of the invention relates to test apparatus for testing mobile terminals designed to operate in an OFDMA system. During testing, all or part of available downlink radio resources available in a cell of the OFDMA system are transmitted. In one exemplary embodiment, the test apparatus comprises a processing unit configured to allocate at least one set of contiguous resource blocks by: allocating a first contiguous portion of the set of the resource blocks to users of a first type; and allocating a second contiguous portion of the set of resource blocks to users of a second type. The test apparatus may further include a transmitter operatively connected to the processing unit for transmitting test signals to the users of the first type and the second type using the at least one contiguous set of resource blocks.

In one or more embodiments the first type of users are test users, and the second type of users are virtual users. Rules governing virtual users to load cells could be specified in the standard for all tests and should be implemented in the test equipment. They may also be implemented in actual base stations for verifying operator specific or standardized tests in real network.

Thus, the test apparatus according to said second aspect of the invention may e.g. be an OFDM simulator for simulating an OFDM system or a radio base station capable of operating in an OFDM system, such as an eNodeB (Evolved NodeB).

Other objects, advantages and novel features of the invention will become apparent from the following detailed description of the invention when considered in conjunction with the accompanying drawings and claims.

BRIEF DESCRIPTION OF THE DRAWINGS

The foregoing and other objects, features and advantages of the invention will be apparent from the following detailed description of preferred embodiments as illustrated in the drawings.

DETAILED DESCRIPTION

The present invention can be exemplified in the following non-limiting description of embodiments of the invention.

Typically only a single mobile terminal, also known as a user equipment (UE) is tested at a time in a lab to verify that the UE under test meets the performance requirements. When test is performed in real network there can be one or multiple UE but in any case the entire cell resources are rarely used. Thus both in a lab or real network tests, the unused resources are transmitted to non existing virtual UEs to load the cell and to thereby mimic a realistic scenario seen in an actual network. The objective of this invention is to define rules, which can be used to transmit both test UE(s) and virtual UEs when verifying UE performance requirements in an OFDMA system. In order words, rules should define the split of OFDMA cell transmission resources between the test user(s) and the virtual users, also referred to as OFDM channel noise generator (OCNG) users. According to embodiments of the invention, resources allocated to the UE or UEs under test and the virtual users are split into contiguous unities. The UE (or UEs) under test does not decode OCNG channels, but only has to decode UE specific channels such as PDSCH and other UE specific channels, for example paging mapped on PDSCH. The objective of OCNG, i.e. virtual users, is only to load the cell in order to create realistic test environment, and not to add complexity to the decoding of UE specific channels e.g PDSCH. Such unnecessary complexity would put additional constraint on the UE that is not relevant for the test performance itself. For the test performance, it is desirable to isolate the test environment from influence that is not relevant for the test. Unnecessary complexity could cause such problems for the UE under test that the purpose of the test being lost, and thus the test would be of no use. Furthermore, randomly generated or distributed arrangement of resources allocated to the UE under test could also lead to inconsistent test results.

Figure 3:
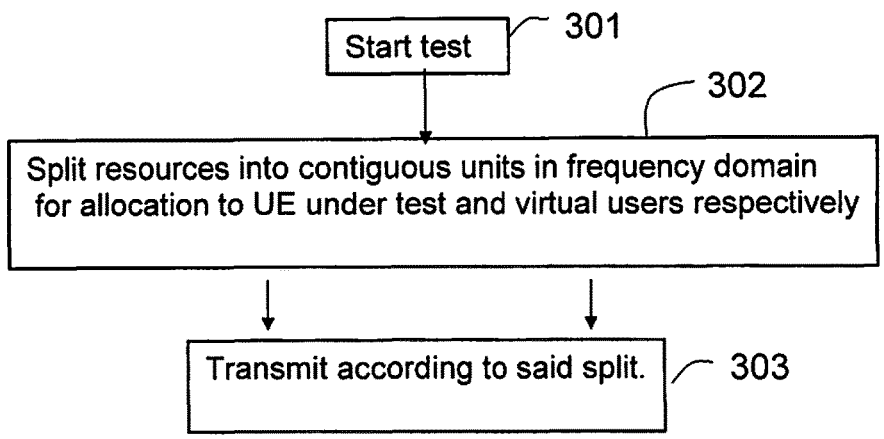
FIG. 3 illustrates a method according to a first embodiment of the invention.

FIG. 3 illustrates a method according to an embodiment of the invention, performed by a transmitting unit for example a base station or a system simulator. The test performance is started in step 301. In step 302, the resources to be transmitted in the test are split in the frequency domain such that certain contiguous unit or units is/are allocated to the UE or UEs under test, and certain other contiguous unit or units is/are allocated to virtual users, also referred to as OCNG users. The transmitting unit thereafter transmits according to said split, step 303.

The embodiments described in the following apply to verification tests in lab as well as those done in a real network.

According to an embodiment of the invention, all the available cell resources (i.e. in test equipment that mimics base station or an actual base station in case of real network test) are divided into three main groups: X, Y and Z. They are allocated as follows:

Group X resources are allocated to common channels, whose position in time and frequency domains are well specified. Examples of common channels are: SCH, PBCH, reference symbols, PCFICH, PDCCH etc Group Y resources are allocated to the test user(s).

Group Z resources are indeed OCNG and are allocated to virtual users, also called OCNG users.

Since common channel allocation is already well defined in the standard, the embodiments described herein will focus on how cell resources are split between group Y, i.e. resources allocated to the test users, and group Z, i.e. resources allocated to OCNG users.

In radio resource management (RRM) tests such as tests related to handover or cell reselection, typically two or more cells are used, where for instance one of the cells is a target cell. Group Y, i.e. the resources allocated to the test users, is in that case used for configuring UE via the initial or a serving cell. This means that as a special case the Y group can be zero in one or more of the cells involved in some RRM tests.

Figure 1:
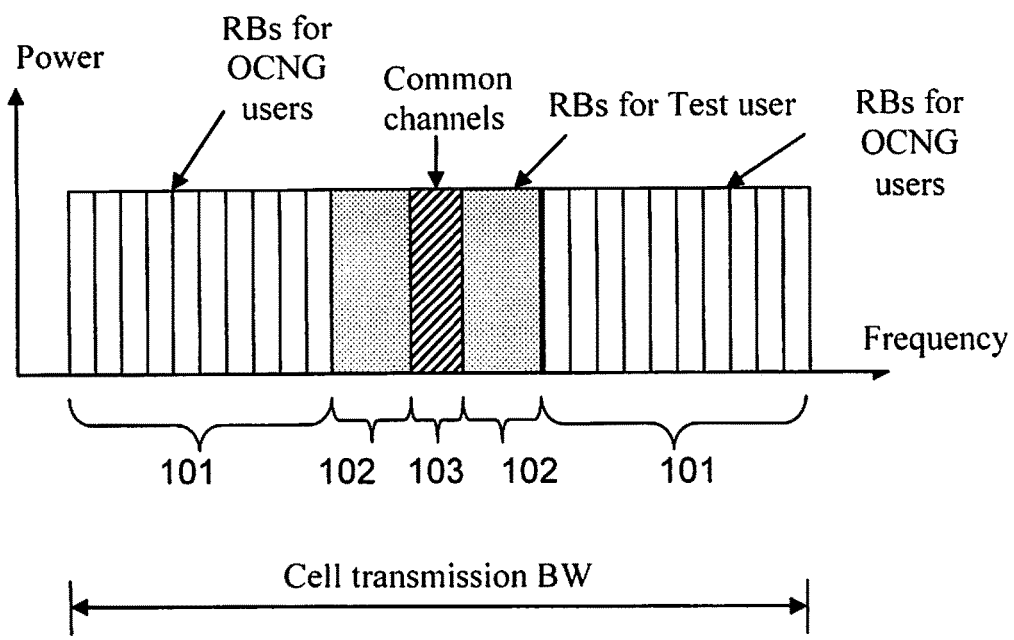
FIG. 1 illustrates an exemplary allocation of radio resources wherein resources at edges of cell transmission bandwidth are allocated to virtual users.
Figure 4:
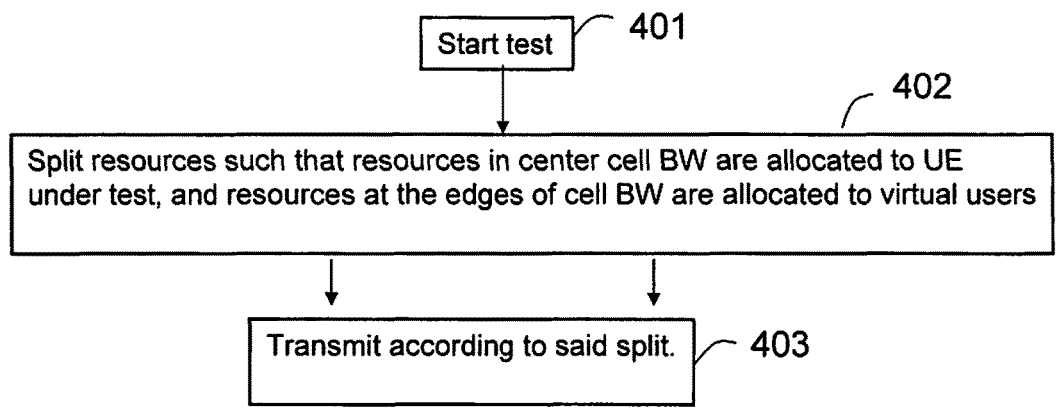
FIG. 4 illustrates a method according to a second embodiment of the invention.

According to one specific embodiment, the resources are allocated such that OCNG users are allocated resource blocks at the edges of the cell bandwidth, while the test user(s) is/are allocated resource blocks (i.e. group Y) in the middle of the cell transmission bandwidth in contiguous manner. Typically, the common channels such as SCH, PBCH, reference symbols, PCFICH, PDCCH are also located in the center of the bandwidth. Thus, the resource blocks allocated to the virtual users i.e. group Z, are arranged in contiguous unities in frequency domain at the edges of the cell bandwidth and scheduled and transmitted to OCNG users, i.e. virtual users. This arrangement is shown in FIG. 1. A method according to this embodiment, performed by a transmitting unit, for example a base station or a system simulator, is illustrated in FIG. 4. The test performance is started in step 401. In step 402, the resources to be transmitted in the test are split in the frequency domain such that a contiguous unit of resource blocks in the center of the cell bandwidth is allocated to the UE or UEs under test, while a contiguous unit of resource blocks at each edge of the cell bandwidth is allocated to virtual users, also referred to as OCNG users. The transmitting unit thereafter transmits according to said split of resources, step 403.

Figure 2:
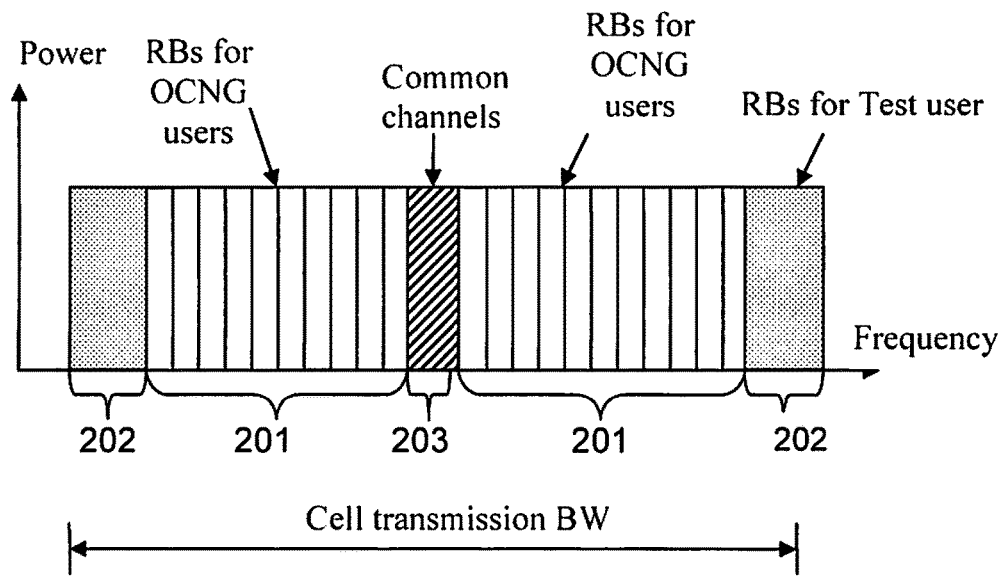
FIG. 2 illustrates an exemplary allocation of radio resources wherein radio resources in the center of cell transmission bandwidth are allocated to virtual users.
Figure 5:
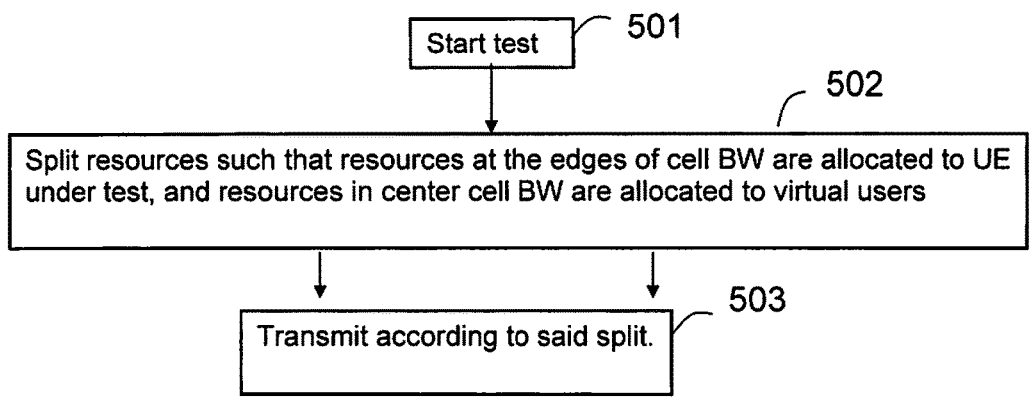
FIG. 5 illustrates a method according to a third embodiment of the invention.

According to an alternative specific embodiment, the resources are allocated such that OCNG users are allocated resource blocks in the middle of the cell bandwidth, while the test user(s) is/are allocated resource blocks (i.e. group Y) at one or both edges of the cell transmission bandwidth in contiguous manner. Thus, the resource blocks allocated to virtual users, i.e. group Z, are arranged in contiguous unities in frequency domain in the center of the cell bandwidth and are transmitted to OCNG users, i.e. virtual users when carrying out the test. This arrangement where OCNG is transmitted in center of the bandwidth is shown in FIG. 2. A method according to this embodiment, performed by a transmitting unit for example a base station or a system simulator, is illustrated in FIG. 5. The test performance is started in step 501. In step 502, the resources to be transmitted in the test are split in the frequency domain such that a contiguous unit of resource blocks at each edge of the cell bandwidth is allocated to the UE or UEs under test, while a contiguous unit of resource blocks in the center of the cell bandwidth is allocated to virtual users, also referred to as OCNG users. The transmitting unit thereafter transmits according to said split of resources, step 503.

The allocation of resource blocks between the test users and the virtual users may be fixed, for example such that 50% of all available resource blocks are allocated to the test user(s). For instance in case of 10 MHz bandwidth there are in total 50 resource blocks (RBs), out of which 25 RBs can be allocated to test user(s). In lab test there is typically only one user and therefore all 25 RBs would be assigned to this user. In case of two or more test users the resource blocks can be equally split between the users or split with different proportion depending upon the type of information to be sent to these users. Dummy data may be transmitted in case the resources allocated to the UE under test are redundant for the test user. This will keep the number of resource blocks constant in group Y and make the test case more stable. The dummy data may comprise of some random sequences, which are stored in the test equipment and periodically sent to the virtual OCNG users.

In a specific arrangement there will be one resource block assigned per each individual OCNG user i.e. there will be as many OCNG users as the number of resource blocks in group Z. In the example above (10 MHz bandwidth) there should according to this rule be 25 OCNG users (i.e. 1 RB per OCNG user). A low bit rate data (e.g. voice service) can be transmitted to OCNG users. In another arrangement there can be fewer OCNG users than the number of resource blocks in group Z, whereby more than one resource block are allocated to each OCNG user. For instance in the above example, if we have five OCNG users, then five resource blocks are allocated to each OCNG user.

It should be noted that in specific embodiments, power can be different on different resource blocks due to power boosting on some channels to improve coverage. This may depend upon the specific test case.

Typically, Quadrature Phase Shift Keying (QPSK) could be used for the modulation of the OCNG transmission. However, depending upon the test also higher order modulation could be used. In a specific embodiment, the modulation used for resources allocated to the virtual users 604 is the same as used for the one or more UEs 603 under test.

In case MIMO (multiple transmit and receive antennas, transmit diversity, cyclic delay diversity, etc) is used, the OCNG can be transmitted from uncorrelated sources, i.e. uncorrelated transmit antennas. Alternatively depending upon the type of test the OCNG can use the same MIMO transmission method and the same correlation model which is used for data transmission to the test user.

Figure 6:
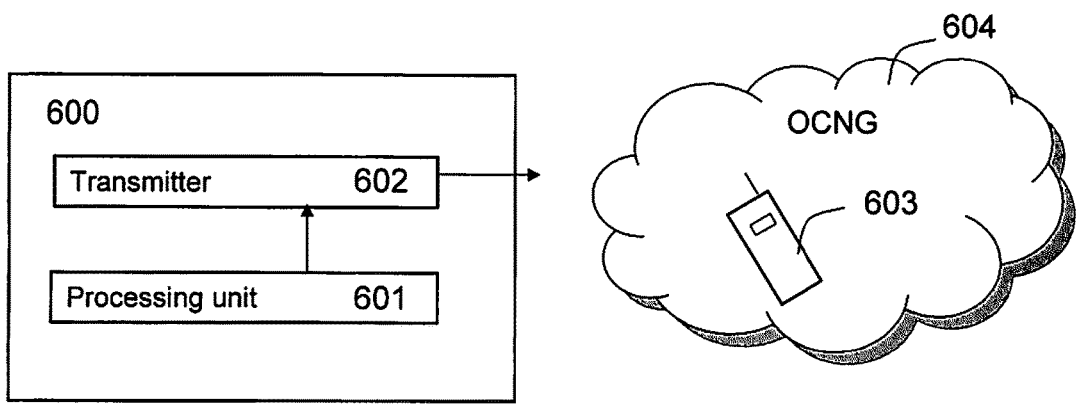
FIG. 6 illustrates a test apparatus capable of carrying out embodiments of the invention.

FIG. 6 illustrates schematically a transmitting unit 600, which can be a base station such as an eNodeB in the case where the test is performed in a real network, or a test equipment such as a system simulator in the case where the test is performed in a lab. For the sake of clarity, only units that are relevant for this invention are illustrated in this figure. A processing unit 601 is configured to split the resources to be used for transmission into contiguous unities in the frequency domain according to a specific rule, and a transmitter 602 is configured to transmit to the UE 603 under test and to virtual users 604, also referred to as OCNG users.

Thus, embodiments of the present invention provide the advantages that:

The load generation in a test is simplified and testing complexity is reduced.

The load generation in a base station such as an e-NodeB is simplified based on the rules above for load tests in real networks.

Performance requirements can be properly verified since consistent rules for generating load in the cell are used in the tests since well defined load generation will allow easy distinction between the performance of good and bad UEs.

An implementation of the invention is exemplified in the following, which constitutes an example of how embodiments of the invention could be included in TS 36.133 version 8.4.0:

OP.1 FDD: OCNG FDD Pattern 1 (Outer Resource Blocks Allocation)

| | | Relative power level $\gamma_{PRB}$ [dB] Subframe | | | | | | | | |
|---|---|---|---|---|---|---|---|---|---|---|
| | | 0 | | | 5 | | | 1-4, 6-9 | | |
| Allocation | CP | Control region OFDM symbols Note 2 | | | | | | | | PDSCH |
| $n_{PRB}$ | length | 1 | 2 | 3 | 1 | 2 | 3 | 1 | 2 | 3 | Data |
| 0-12 | N | 0 | | | 0 | | | 0 | | | Note 1 |
| 37-49 | N | 0 | | | 0 | | | 0 | | | |

Note 1:
Each physical resource block (PRB) is assigned to an individual virtual UE. The data for each virtual UE shall be uncorrelated with data from other virtual UEs over the period of any measurement. The data shall be QPSK modulated. The parameter $\gamma_{PRB}$ is used to scale the power of PDSCH.

Note 2:
The control region consists of PCFICH, PHICH and PDCCH. Number of OFDM symbols belonging to the control region may vary between subframes.

N: Normal

Table A.3.2.1.2-1: OP.2 FDD: OCNG FDD Pattern 2 (Full Bandwidth Allocation)

| | | Relative power level $\gamma_{PRB}$ [dB] Subframe | | | | | | | | |
|---|---|---|---|---|---|---|---|---|---|---|
| | | 0 | | | 5 | | | 1-4, 6-9 | | |
| Allocation | CP | Control region OFDM symbols Note 2 | | | | | | | | PDSCH |
| $n_{PRB}$ | length | 1 | 2 | 3 | 1 | 2 | 3 | 1 | 2 | 3 | Data |
| 0-49 | N | 0 | | | 0 | | | 0 | | | Note 1 |

Note 1:
Each physical resource block (PRB) is assigned to an individual virtual UE. The data for each virtual UE shall be uncorrelated with data from other virtual UEs over the period of any measurement. The data shall be QPSK modulated. The parameter $\gamma_{PRB}$ is used to scale the power of PDSCH.

Note 2:
The control region consists of PCFICH, PHICH and PDCCH. Number of OFDM symbols belonging to the control region may vary between subframes.

N: Normal

OP.1 TDD: OCNG TDD Pattern 1 (Outer Resource Blocks Allocation) for 5 ms Downlink-to-Uplink Switch-Point Periodicity

| Allocation $n_{PRB}$ | CP length | Relative power level $\gamma_{PRB}$ [dB] Subframe | | | | | | | | | | PDSCH Data |
|---|---|---|---|---|---|---|---|---|---|---|---|---|
| | | 0 | | | 5 | | | 3, 4, 8, 9 Note 2 | | 1, 6 | | |
| | | Control region OFDM symbols Note 3 | | | | | | | | | | |
| | | 1 | 2 | 3 | 1 | 2 | 3 | 1 | 2 | 3 | 1 | 2 | |
| 0-12 | N | 0 | | | 0 | | | 0 | | | Table A.3.2.2.1-2 | | Note 1 |
| 37-49 | N | 0 | | | 0 | | | 0 | | | | | |

Note 1:
Each physical resource block (PRB) is assigned to an individual virtual UE. The data for each virtual UE shall be uncorrelated with data from other virtual UEs over the period of any measurement. The data shall be QPSK modulated. The parameter $\gamma_{PRB}$ is used to scale the power of PDSCH.
Note 2:
Subframes available for DL transmission depends on the Uplink-Downlink configuration defined in Table 4.2-2 in 3GPP TS 36.211 [16].
Note 3:
The control region consists of PCFICH, PHICH and PDCCH. Number of OFDM symbols belonging to the control region may vary between subframes.
N: Normal OP.1 TDD: OCNG TDD Pattern 1 (Outer Resource Blocks Allocation) for Special Subframe Configuration with 5 ms Downlink-to-Uplink Switch-Point Periodicity

| Allocation $n_{PRB}$ | CP length | Relative power level $\gamma_{PRB}$ [dB] Special subframe configuration | | | | | | | | | | | | | | | | |
|---|---|---|---|---|---|---|---|---|---|---|---|---|---|---|---|---|---|---|
| | | 0 | | 1 | | 2 | | 3 | | 4 | | 5 | | 6 | | 7 | | 8 |
| | | Control region OFDM symbols | | | | | | | | | | | | | | | | |
| | | 1 | 2 | 1 | 2 | 1 | 2 | 1 | 2 | 1 | 2 | 1 | 2 | 1 | 2 | 1 | 2 | |
| 0-12 | N | 0 | 0 | 0 | 0 | 0 | 0 | 0 | 0 | 0 | | | | | | | | |
| 37-49 | N | 0 | 0 | 0 | 0 | 0 | 0 | 0 | 0 | 0 | | | | | | | | |

Note 1:
Special subframe configurations are defined in Table 4.2-1 in TS 36.211 [16].

Table A.3.2.2.2-1: OP.2 TDD: OCNG TDD Pattern 2 (Full Bandwidth Allocation) for 5 ms Downlink-to-Uplink Switch-Point Periodicity

| Allocation $n_{PRB}$ | CP length | Relative power level $\gamma_{PRB}$ [dB] Subframe | | | | | | | | | | PDSCH Data |
|---|---|---|---|---|---|---|---|---|---|---|---|---|
| | | 0 | | | 5 | | | 3, 4, 8, 9 Note 2 | | 1, 6 | | |
| | | Control region OFDM symbols Note 3 | | | | | | | | | | |
| | | 1 | 2 | 3 | 1 | 2 | 3 | 1 | 2 | 3 | 1 | 2 | |
| 0-49 | N | 0 | | | 0 | | | 0 | | | Table A.3.2.2.2-2 | | Note 1 |

Note 1:
Each physical resource block (PRB) is assigned to an individual virtual UE. The data for each virtual UE shall be uncorrelated with data from other virtual UEs over the period of any measurement. The data shall be QPSK modulated. The parameter $\gamma_{PRB}$ is used to scale the power of PDSCH.
Note 2:
Subframes available for DL transmission depends on the Uplink-Downlink configuration in Table 4.2-2 in 3GPP TS 36.211 [16].
Note 3:
The control region consists of PCFICH, PHICH and PDCCH. Number of OFDM symbols belonging to the control region may vary between subframes.
N: Normal OP.2 TDD: OCNG TDD Pattern 2 (Full Bandwidth Allocation) for Special Subframe Configuration with 5 ms Downlink-to-Uplink Switch-Point Periodicity

| Allocation $n_{PRB}$ | CP length | Relative power level $\gamma_{PRB}$ [dB] Special subframe configuration | | | | | | | | | | | | | | | | |
|---|---|---|---|---|---|---|---|---|---|---|---|---|---|---|---|---|---|---|
| | | 0 | | 1 | | 2 | | 3 | | 4 | | 5 | | 6 | | 7 | | 8 |
| | | Control region OFDM symbols | | | | | | | | | | | | | | | | |
| | | 1 | 2 | 1 | 2 | 1 | 2 | 1 | 2 | 1 | 2 | 1 | 2 | 1 | 2 | 1 | 2 | |
| 0-49 | N | 0 | 0 | 0 | 0 | 0 | 0 | 0 | 0 | 0 | | | | | | | | |

Note 1:
Special subframe configurations are defined in Table 4.2-1 in 3GPP TS 36.211 [16].

The abbreviations used in the specification have the following meanings:

The present invention may, of course, be carried out in other ways than those specifically set forth herein without departing from essential characteristics of the invention. The present embodiments are to be considered in all respects as illustrative and not restrictive.

What is claimed is:

1. A method for testing Orthogonal Frequency Division Multiplexing (OFDM) mobile terminals, said method comprising:
splitting radio resources available in a cell of an OFDM system into contiguous unities in the frequency domain;
wherein the radio resources of one or more of said contiguous unities in the center of an available cell bandwidth are allocated to one or more mobile terminals being tested; and
wherein the radio resources of at least one of said contiguous unities are allocated to virtual users, said virtual users emulating a load of a cell to create a realistic test environment for the mobile terminals being tested; and
transmitting test signals to the one or more mobile terminals being tested on the radio resources allocated to the one or more mobile terminals being tested and transmitting test signals to the virtual users on the radio resources allocated to the virtual users to verify performance requirements in an OFDM system for the one or more mobile terminals being tested under the emulated load.

2. The method according to claim 1 wherein splitting the radio resources available in the cell of the OFDM system into contiguous unities in the frequency domain comprises splitting the radio resources such that at least one of the one or more contiguous unities of radio resources at the edges of said cell bandwidth are allocated to virtual users.

3. The method according to claim 1 further comprising allocating one resource block out of the contiguous unities of radio resources available for the virtual users to each of the said virtual users.

4. The method according to claim 1 wherein transmitting the test signals to said virtual users on radio resources allocated to the virtual users comprises transmitting Quadrature Phase Shift Keying (QPSK) modulated signals to the virtual users on radio resources allocated to the virtual users.

5. The method according to claim 1 wherein transmitting the test signals to said virtual users on radio resources allocated to the virtual users comprises transmitting test signals to the virtual users from two or more uncorrelated transmitted antennas.

6. The method according to claim 1 wherein transmitting the test signals to said virtual users on radio resources allocated to the virtual users comprises transmitting test signals according to the same Multiple Input Multiple Output (MIMO) transmission method and using same correlation model as used for the one or more mobile terminals under test.

7. The method according to claim 1 wherein the allocation of radio resources to the one or more mobile terminals under test and the virtual users respectively is fixed.

8. The method according to claim 1 wherein transmitting the test signals to said one or more mobile terminals being tested on the radio resources allocated to the mobile terminals being tested comprises the step of transmitting Physical Downlink Shared Channel (PDSCH) signals as test signals on radio resources allocated for the one or more mobile terminals being tested.

9. The method according to claim 1 carried out by an OFDMA simulator capable of simulating an OFDMA system.

10. The method according to claim 1 carried out by a base station capable of operating in an OFDMA system.

11. A test apparatus for testing mobile terminals in an Orthogonal Frequency Division Multiplexing (OFDM) system, said test apparatus comprising:
a processing circuit configured to split radio resources in an OFDMA cell into contiguous unities in the frequency domain;
wherein the radio resources of one or more of said contiguous unities in the center of an available cell bandwidth are allocated to one or more mobile terminals being tested; and
wherein the radio resources of at least one of said contiguous unities are allocated to virtual users, said virtual users emulating a load of a cell to create a realistic test environment for the mobile terminals being tested;
a transmitter operatively connected to the processing circuit, the transmitter configured to transmit test signals to the one or more mobile terminals being tested on the radio resources allocated to the mobile terminals being tested, and to transmit test signals to the virtual users on the radio resources allocated to the virtual users to verify performance requirements in an OFDM system for the one or more mobile terminals being tested under the emulated load.

12. The test apparatus according to claim 11 wherein said processing circuit is configured to split the radio resources such that at least one of the one or more contiguous unities of radio resources at the edges of said cell bandwidth are allocated to virtual users.

13. The test apparatus according to claim 11 wherein said processing circuit is configured to allocate one resource block out of the contiguous unities of radio resources available for the virtual users to each of the said virtual users.

14. The test apparatus according to claim 11 wherein said processing circuit is configured to use Quadrature Phase Shift Keying (QPSK) modulation for test signals transmitted by the transmitter on radio resources allocated to the virtual users.

15. The test apparatus according to claim 11 wherein the transmitter is configured to transmit the test signals to the virtual users via two or more uncorrelated transmitted antennas to simulate Multiple Input Multiple Output (MIMO) operations.

16. The test apparatus according to claim 11 wherein the transmitter is configured to transmit the test signals to the virtual users using the same Multiple Input Multiple Output (MIMO) transmission method and the same correlation model as used for the one or more mobile terminals under test to simulate MIMO operations.

17. The test apparatus according to claim 11 wherein the processing circuit is configured to allocate radio resources to the one or more mobile terminals under test and the virtual users in a fixed manner.

18. The test apparatus according to claim 11 wherein the transmitter is configured to transmit Physical Downlink Shared Channel (PDSCH) signals as the test signals on radio resources allocated to the one or more mobile terminals under test.

19. The test apparatus according to claim 11 wherein said test apparatus comprises an OFDMA simulator capable of simulating an OFDMA system.

20. The test apparatus according to claim 11 wherein said test apparatus comprises a base station capable of operating in an OFDMA system.

* * * * *

UNITED STATES PATENT AND TRADEMARK OFFICE
CERTIFICATE OF CORRECTION

PATENT NO. : 10,219,172 B2
APPLICATION NO. : 15/051986
DATED : February 26, 2019
INVENTOR(S) : Kazmi et al.

It is certified that error appears in the above-identified patent and that said Letters Patent is hereby corrected as shown below:

On the Title Page

In Item (56), under "OTHER PUBLICATIONS", in Column 2, Line 1, delete "(normaltive):" and insert -- (normative): --, therefor.

On Page 2, in Item (56), under "OTHER PUBLICATIONS", in Column 2, Line 1, delete "(normaltive):" and insert -- (normative): --, therefor.

In the Specification

In Column 1, Line 8, delete "2012," and insert -- 2012, now Pat. No. 9,307,426, --, therefor.

In Column 1, Line 10, delete "2009," and insert -- 2009, now Pat. No. 8,411,553, --, therefor.

In Column 1, Line 44, delete "delay" and insert -- delay. --, therefor.

In Column 1, Line 47, delete "network" and insert -- network. --, therefor.

In Column 3, Line 42, delete "(PHICH)" and insert -- (PHICH). --, therefor.

In Column 4, Line 15, delete "blocks" and insert -- blocks. --, therefor.

In Column 6, Line 22, delete "etc" and insert -- etc. --, therefor.

In Column 9, Line 14, delete "$\gamma_{pRB}$" and insert -- $\gamma_{PRB}$ --, therefor.

Signed and Sealed this
Thirtieth Day of July, 2019

Andrei Iancu
*Director of the United States Patent and Trademark Office*